United States Patent
Talon

(10) Patent No.: US 9,451,846 B2
(45) Date of Patent: Sep. 27, 2016

(54) CAPSULE FOR USE IN A FOOD PREPARATION MACHINE

(71) Applicant: NESTEC S.A., Vevey (CH)

(72) Inventor: Christian Talon, Vufflens-le-Chateau (CH)

(73) Assignee: NESTEC S.A., Vevey (CH)

( * ) Notice: Subject to any disclaimer, the term of this patent is extended or adjusted under 35 U.S.C. 154(b) by 0 days.

(21) Appl. No.: 14/414,824

(22) PCT Filed: Jul. 19, 2013

(86) PCT No.: PCT/EP2013/065270
§ 371 (c)(1),
(2) Date: Jan. 14, 2015

(87) PCT Pub. No.: WO2014/016208
PCT Pub. Date: Jan. 30, 2014

(65) Prior Publication Data
US 2015/0157165 A1 Jun. 11, 2015

(30) Foreign Application Priority Data

Jul. 24, 2012 (EP) ..................................... 12177645

(51) Int. Cl.
*B65D 85/804* (2006.01)
*A47J 31/40* (2006.01)

(52) U.S. Cl.
CPC .......... *A47J 31/407* (2013.01); *B65D 85/8043* (2013.01); *B65D 85/8046* (2013.01)

(58) Field of Classification Search
CPC .......... B65D 85/8043; B65D 85/8046; B65D 85/804; A47J 31/407; A47J 31/40
USPC ............ 206/0.5; 210/464–469, 477; 99/295, 99/323
See application file for complete search history.

(56) References Cited

U.S. PATENT DOCUMENTS

| 5,472,719 | A | * | 12/1995 | Favre | A47J 31/0673 426/112 |
| 2002/0078831 | A1 | * | 6/2002 | Cai | A47J 31/14 99/295 |
| 2003/0222089 | A1 | * | 12/2003 | Hale | B65D 85/8043 220/574 |
| 2007/0148290 | A1 | * | 6/2007 | Ternite | B65D 85/8043 426/90 |
| 2009/0032454 | A1 | | 2/2009 | Rapparini | |
| 2010/0077928 | A1 | | 4/2010 | Schmed et al. | |
| 2010/0307930 | A1 | | 12/2010 | Zangerle | |

FOREIGN PATENT DOCUMENTS

| DE | 202005021160 | 4/2007 |
| EP | 1710173 | 10/2006 |
| EP | 2210827 | 7/2010 |
| EP | 2444339 | 4/2012 |
| WO | WO 2010/128031 | * 11/2010 |

* cited by examiner

*Primary Examiner* — King M Chu
(74) *Attorney, Agent, or Firm* — K&L Gates LLP

(57) ABSTRACT

The present invention concerns a capsule (1) for containing a food ingredient, adapted for use in a food preparation machine able to inject a fluid under pressure inside said capsule to prepare a food product, said capsule comprising a capsule body with side walls (2), a top wall (3), and an impermeable flexible pierceable bottom membrane (4), characterized in that it further comprises a rigid support structure (5, 7) located adjacent and outside of said flexible pierceable bottom membrane, such that said structure covers and supports partially said membrane (4).

12 Claims, 1 Drawing Sheet

CAPSULE FOR USE IN A FOOD PREPARATION MACHINE

CROSS REFERENCE TO RELATED APPLICATIONS

The present application is a National Stage of International Application No. PCT/EP2013/065270, filed on Jul. 19, 2013, which claims priority to European Patent Application No. 12177645.4, filed on Jul. 24, 2012, the entire contents of which are being incorporated herein by reference.

FIELD OF THE INVENTION

The present invention concerns an ingredient capsule for use in a food preparation machine, typically a beverage preparation machine.

BACKGROUND OF THE INVENTION

Beverage preparation machines are well known in the food science and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine of the invention is a beverage preparation machine working with a rigid or semi-rigid capsule.

The machine comprises a receptacle or cavity for accommodating said capsule and a fluid injection system for injecting a fluid, preferably water, under pressure into the capsule. Water injected under pressure in the capsule, for the preparation of a coffee beverage according to the present invention, is preferably hot, that is to say at a temperature above 70° C. However, in some particular instances, it might also be at ambient temperature, or even chilled. The pressure inside the capsule chamber during extraction and/or dissolution of the capsule contents is typically about 1 to about 8 bar for dissolution products and about 2 to about 12 bar for extraction of roast and ground coffee. Such a preparation process differs a lot from the so-called "brewing" process of beverage preparation—particularly for tea and coffee, in that brewing involves a long time of infusion of the ingredient by a fluid (e.g. hot water), whereas the beverage preparation process allows a consumer to prepare a beverage, for instance coffee, within a few seconds.

The principle of extracting and/or dissolving the contents of a closed capsule under pressure is known, and consists typically of inserting the capsule in a receptacle or cavity of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patents No. EP 1472156 B1, and EP 1784344 B1.

Machines allowing the application of this principle have already been described for example in patents CH 605 293 and EP 242 556. According to these documents, the machine comprises a receptacle or cavity for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally though the heating element. The way the water circulates within the machine is e.g. selected via a selecting valve means, such as for instance a peristaltic valve of the type described in applicant's European patent application EP 2162653 A1.

When the beverage to be prepared is coffee, one interesting way to prepare the coffee is to provide the consumer with a capsule containing roast and ground coffee powder, which is to be extracted with hot water injected therein.

In many instances, the machine comprises a capsule holder for holding a capsule, which is intended to be inserted in and removed from a corresponding cavity or receptacle of the machine. When a capsule holder is loaded with a capsule and inserted within the machine in a functional manner, the water injection means of the machine can fluidly connect to the capsule to inject water therein for a food preparation, as described above. A capsule holder was described for example in applicant's European patent EP 1967100 B1.

Capsules have been developed for such an application of food preparation, and in particular for beverage preparation, which are described and claimed in applicant's European patent EP 1784344 B1, or in European patent application EP 2062831.

In short, such capsules comprise typically:
- a hollow body and an injection wall which is impermeable to liquids and to air and which is attached to the body and adapted to be punctured by e.g. an injection needle of the machine,
- a chamber containing a bed of roast and ground coffee to be extracted, or a soluble ingredient or mix of soluble ingredients,
- an aluminium membrane disposed at the bottom end of the capsule, closing the capsule, for retaining the internal pressure in the chamber.

The aluminium membrane is designed for being pierced with piercing means that are either integral with the capsule, or located outside of said capsule, for example within a capsule holder of the machine.

In the field of the present invention, it is considered that the piercing means is located outside of the capsule, for instance the piercing means is integrated to a capsule holder.

Usually, the piercing means is a plate having a substantially disc-shaped surface covered with piercing elements such as small pyramids or spikes, adapted in shape and size to pierce through the bottom membrane of the capsule when the latter is bent due to internal fluid pressure building-up within the capsule. Beyond the piercing effect, the piercing means also has a function of support of the bottom membrane, and ensures that the latter does not bend too much when subject to internal pressure within the capsule. It therefore prevents that the bottom membrane is completely torn open by the pressure. This would be particularly undesirable, since a wide opening through the membrane could allow ingredient material (e.g. roast and ground coffee) to pass through, and fall into the consumer cup, which would result in beverage contamination giving very poor in-cup product quality. The opening of the bottom membrane by the piercing means is therefore the result of a balanced mechanical effect, providing small openings through the membrane, which are due to action of the piercing elements, while the same piercing means prevents wide opening, bursting, or similarly wide tearing of the same bottom membrane.

As described and illustrated in the prior art publications, for instance in EP 1472156 B1, the surface of the piercing means—which in the cited prior art is a piercing plate—substantially corresponds to the surface of the capsule pierceable bottom membrane.

In some instances though, particularly when the beverage machine is made compatible with several capsule types, the piercing means can be designed such that its surface does not correspond to the entire surface of the bottom membrane. For example, the centre of the piercing means can be made hollow, and the piercing elements are distributed across a ring-shaped area rather than a disc-shaped area.

In such instances when the surface of the piercing means does not correspond to the surface of the capsule pierceable bottom membrane, the latter can burst or be torn before the appropriate pressure is reached within the capsule.

Capsule bursting can be such that a too wide opening is created through the bottom membrane of said capsule, through which some non-consumable ingredient e.g. coffee particles, can escape and flow into the cup, which is of course highly undesirable, as it results in a messy product dispensing, and poor quality of the resulting product in cup (e.g. mix of liquid coffee with solid coffee particles). This is especially the case if the piercing means of the machine comprise a zone which is hollow, i.e. does not comprise.

Moreover, product to be prepared inside the capsule requires an appropriate pressure and temperature, in order to achieve the best texture and taste. If the bottom membrane of the capsule opens too rapidly, the adequate internal pressure within the capsule is not reached and the resulting product does not have appropriate sensory quality.

It is therefore a main objective of the invention to provide an ingredient capsule for use in a food, e.g. a beverage, preparation machine, that prevents inadequate (typically too early and/or too wide) capsule opening, and therefore to provide the best in-cup quality to the consumer, in particular when the piercing means of the machine is not specifically adapted to opening such a capsule.

SUMMARY OF THE INVENTION

The main objective set out above is met with a capsule for containing a food ingredient, adapted for use in a food preparation machine able to inject a fluid under pressure inside said capsule to prepare a food product, said capsule comprising a capsule body with side walls, a top wall, and an impermeable flexible pierceable bottom membrane, characterized in that it further comprises a rigid support structure located adjacent and outside of said flexible pierceable bottom membrane, such that said structure covers and supports partially said membrane.

The supporting effect achieved by the supporting structure is against a vertical deformation of the pierceable bottom membrane, in some area where deformation, and piercing of said membrane is not required. This is for instance the case in the centre of said bottom membrane. Since the latter is deformable, when pressure builds up within the capsule compartment, the pressure acts vertically against the bottom membrane, which tends to bend downwards. Bursting or tearing of said membrane occurs too rapidly, preferentially in the centre, in absence of the supporting structure according to the invention.

In a highly preferred embodiment of the invention, the support structure comprises:

(i) at least one support area having a thickness and a rigidity sufficient to withstand internal pressure within said capsule, up to 12 bar, preferably up to 15 bar, more preferably up to 20 bar, and (ii) at least one open-worked, punched, or otherwise open area that does not support the bottom membrane of the capsule.

Advantageously, at least one support area of the support structure is located so as to support the centre of the bottom membrane.

Also advantageously, the support structure can be integrally formed with the capsule side walls, for instance by injection moulding the capsule side walls with the support structure at the bottom. In such a case, the pierceable bottom membrane of the capsule can be welded at the inside bottom portion of the capsule side walls thereafter.

In a preferred embodiment of the invention, the flexible bottom membrane is pierceable when the pressure inside the capsule is comprised between 0.1 and 20 bar, preferably between 1 and 1.5 bar, more preferably between 2 and 1.2 bar.

Advantageously, the bottom membrane can be made of aluminium and has a thickness comprised between 1.0 μm and 1.00 μm, preferably 20 μm and 50 μm.

Also advantageously, the thickness of the side walls can be between 50 μm and 1.000 μm, preferably between 1.00 μm and 500 μm.

In any case, the ingredient is preferably a beverage ingredient, such as roast and ground coffee, leaf tea, a soluble powdered coffee, tea, chocolate, fruit and/or vegetable juice, soup, milk or creamer, infant nutrition product, or a combination thereof.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
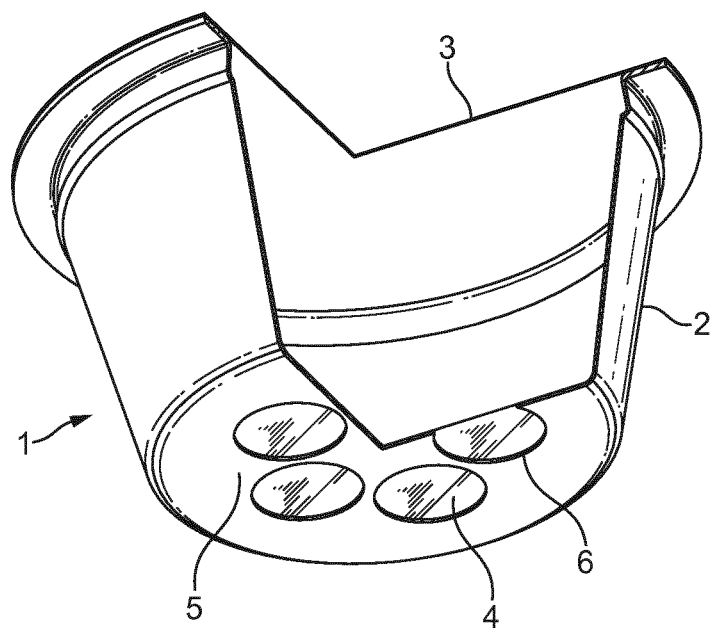
FIG. 1 is a schematic, partially cut, perspective view of a first embodiment of a capsule according to the present invention.

The capsule 1 illustrated in FIG. 1 is adapted for containing a beverage ingredient, such as roast and ground coffee. It comprises a thermoformed rigid or semi-rigid capsule body with side walls 2, a top pierceable membrane 3 that is sealed onto the upper edges of the side walls, and a bottom pierceable flexible membrane 4 that is sealed onto the internal surface of the side walls, at their lower part.

According to the invention, the capsule comprises a support structure 5 which is integrally made with the side walls 2 when said capsule is thermoformed from a single plastic sheet. The capsule further comprises punched out windows 6 that define dispensing holes. Through the bottom windows, the bottom membrane 4 is visible, and accessible from the outside, since said membrane is adjacent to the support structure 5, as shown in FIG. 1.

When the capsule is functionally inserted into the receptacle of a beverage preparation machine, and said machine injects a fluid under pressure through the top membrane 3, into the capsule, fluid pressure builds-up within the capsule. As fluid pressure increases, the bottom membrane is able to deflect and bend downwards, until it contacts piercing elements such as small sharp pyramids of piercing means— for instance a piercing plate—disposed there below. The piercing plate is part of the machine, for instance it can be integrated to the capsule holder of said machine. When the membrane bends and presses sufficiently onto the piercing elements, it is pierced and the beverage prepared within the capsule by mixing the beverage ingredient and the fluid under pressure, can escape and flow into a cup placed below. The surface of the rounded windows is sufficient to ensure that the bottom membrane 4 does not flex too much so that it is not torn open, in particular in its centre portion.

Alternatively, to a thermoformed and punched out manufacturing process, the capsule according to the invention, and as illustrated in FIG. 1, can be injected in one piece. Or as another possible alternative, the capsule can be injected in two pieces, one for the capsule side walls 2 and another for the support structure 5, both parts being then assembled to complete the capsule body.

All constitutive parts of the capsule, including the top 3 and bottom 4 membranes, are impermeable, and preferably they are made of a gas-tight material. It is important that none of the capsule walls be permeable to liquids, in order to ensure that a proper fluid pressure can build up inside the capsule during the preparation of the food or beverage product. Fluid leakage trough a wall of the capsule could lead to a poor internal pressure build-up which would impact negatively on the product quality, and in some cases, it could even prevent the bottom membrane 4 from bending sufficiently towards the machine piercing means, resulting in a capsule not opening at all, which is of course highly undesirable.

Figure 2:
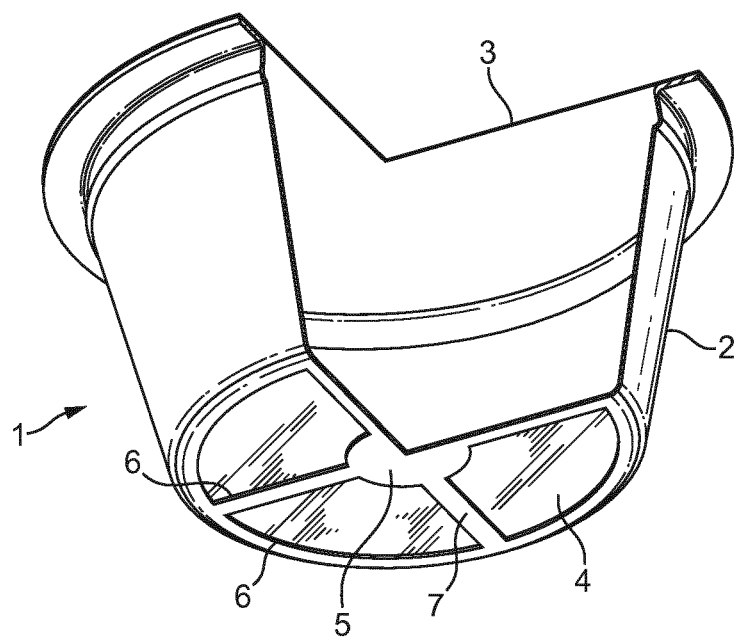
FIG. 2 is a schematic, partially cut, perspective view of a second embodiment of a capsule according to the present invention.

An alternative embodiment of the invention is illustrated in FIG. 2. The capsule 1 shown therein is very similar to that of FIG. 1 described above. However, in that case, the capsule side walls 2 do not extend to the bottom side of the capsule body, such that the bottom pierceable membrane 4 is largely accessible from below said capsule. The support structure comprises a main central portion 5 that is linked to the lower edge of the capsule side walls 2 by at least two, preferably three, more preferably four linking arms 7.

When the capsule is functionally inserted inside the corresponding capsule receptacle of a food (e.g. beverage) preparation machine, and when a fluid is injected under pressure within said capsule through the top membrane 3, fluid pressure within the capsule increases as said fluid is mixed with a food ingredient contained therein. As capsule pressure builds up, the bottom membrane 4 flexes downward and contacts the piercing elements (e.g. sharp pyramid-like protrusions) of the machine piercing means (not illustrated in the drawing). When fluid pressure inside the capsule is sufficient, the portions of the bottom membrane 4 in contact with the piercing elements is sufficient to pierce through said membrane and allow the product prepared within said capsule to be released. In spite of the relatively high opening pressure, which can be up to 15 bar, but is preferably within the range of 2 to 12 bar, the whole membrane cannot flex downward such that a mechanical forces exerted on said membrane are insufficient to tear the latter completely.

With a capsule according to the invention, a proper balance is achieved between:
- the support effect of the support structure 5, which ensures that the whole membrane does not flex and therefore prevents complete tearing, and
- the possibility of some parts of said bottom membrane to flex down onto the piercing means such that they can be pierced with small dispensing holes having a diameter sufficiently small to let a liquid through but not solid particles, e.g. pierced holes having a diameter within the range of 10 to 1000 µm, preferably between 50 and 700 µm.

In order to achieve such a proper balanced deformation effect of the bottom membrane, the surface of the support structure 5 is preferably such that the surface of the bottom membrane 4 which is not supported, i.e. which is free to flex under internal capsule pressure, corresponds to the surface of the piercing means being covered with piercing elements. As explained above, said piercing elements do not only play the role of opening structures, but at the same time, they limit the deformation of the bottom membrane, such that the latter is pierced without tearing.

Lastly, the support of the bottom membrane can be manufactured by coating said bottom membrane with a glue or other suitable polymeric material that solidifies, which provides a solid, un-deformable coated support.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A capsule for containing a food ingredient, adapted for use in a food preparation machine able to inject a fluid under pressure inside the capsule to prepare a food product, the capsule comprising:
   a capsule body with side walls;
   a top wall;
   an impermeable flexible pierceable bottom membrane; and
   a rigid support structure located adjacent and outside of the flexible pierceable bottom membrane, the rigid support structure comprising (1) a planar support area that contacts at least the center of the membrane, and (2) one or more windows in the same horizontal plane as the support area.

2. A capsule according to claim 1, wherein the support structure comprises:
   at least one support area having a thickness and a rigidity sufficient to withstand internal pressure within the capsule, of up to 12 bar; and
   at least one window that does not support the bottom membrane of the capsule.

3. A capsule according to claim 1, wherein the support structure is integrally formed with the capsule side walls.

4. A capsule according to claim 1, wherein the flexible bottom membrane is pierceable when the pressure inside the capsule is between 0.1 and 20 bar.

5. A capsule according to claim 4, wherein the bottom membrane is made of aluminium and has a thickness of between 10 μm and 100 μm.

6. A capsule according to claim 1, wherein the thickness of the side walls is between 50 μm and 1000 μm.

7. A capsule according to claim 1, wherein the ingredient is a beverage ingredient.

8. A capsule for containing a food ingredient, adapted for use in a food preparation machine able to inject a fluid under pressure inside the capsule to prepare a food product, the capsule comprising:
 a capsule body with side walls;
 a top wall;
 an impermeable flexible pierceable bottom membrane; and
 a rigid support structure located adjacent and outside of the flexible pierceable bottom membrane, the rigid support structure comprising (1) a planar support area that contacts at least the center of the membrane, and (2) one or more windows in the same horizontal plane as the support area, and the food ingredient is selected from the group consisting of roast and ground coffee, leaf tea, a soluble powdered coffee, tea, chocolate, fruit and/or vegetable juice, soup, milk or creamer, infant nutrition product, and combinations thereof.

9. The capsule according to claim 1, wherein the one or more windows are a plurality of windows concentrically arranged around a main central portion of the support area.

10. The capsule according to claim 8, wherein the one or more windows are a plurality of windows concentrically arranged around a main central portion of the support area.

11. A capsule for containing a food ingredient, adapted for use in a food preparation machine able to inject a fluid under pressure inside the capsule to prepare a food product, the capsule comprising:
 a capsule body with side walls;
 a top wall;
 an impermeable flexible pierceable bottom membrane; and
 a rigid support structure located adjacent and outside of the flexible pierceable bottom membrane, the rigid support structure comprising (1) a planar support area that supports at least a center of the membrane, and (2) one or more windows in the same horizontal plane as the support area, wherein the support structure comprises a main central portion connected to a lower edge of the capsule side walls by linking arms, and the windows extend from the side walls to the main central portion.

12. A capsule for containing a food ingredient, adapted for use in a food preparation machine able to inject a fluid under pressure inside the capsule to prepare a food product, the capsule comprising:
 a capsule body with side walls;
 a top wall;
 an impermeable flexible pierceable bottom membrane; and
 a rigid support structure located adjacent and outside of the flexible pierceable bottom membrane, the rigid support structure comprising (1) a planar support area that supports at least a center of the membrane, and (2) one or more windows in the same horizontal plane as the support area, wherein the support structure comprises a main central portion connected to a lower edge of the capsule side walls by linking arms, the windows extend from the side walls to the main central portion, and the food ingredient is selected from the group consisting of roast and ground coffee, leaf tea, a soluble powdered coffee, tea, chocolate, fruit and/or vegetable juice, soup, milk or creamer, infant nutrition product, and combinations thereof.

\* \* \* \* \*